(12) United States Patent
Conrado et al.

(10) Patent No.: US 7,010,547 B2
(45) Date of Patent: Mar. 7, 2006

(54) METHOD AND SYSTEM FOR PROVIDING A USER PROFILE

(75) Inventors: Claudine Viegas Conrado, Eindhoven (NL); Joanna Elzbieta Kabala, Eindhoven (NL); Cornelius Wilhelmus Antonius Marie Van Overveld, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 116 days.

(21) Appl. No.: 10/014,183

(22) Filed: Dec. 11, 2001

(65) Prior Publication Data

US 2002/0085031 A1 Jul. 4, 2002

(30) Foreign Application Priority Data

Dec. 14, 2000 (EP) .......................................... 00204508

(51) Int. Cl.
*G06F 17/30* (2006.01)

(52) U.S. Cl. .................... 707/104.1; 707/2; 715/763
(58) Field of Classification Search ................ 707/2–3, 707/104.1; 715/762, 763; 345/473, 474
See application file for complete search history.

(56) References Cited

U.S. PATENT DOCUMENTS

| 6,195,651 | B1 | * | 2/2001 | Handel et al. ................. 707/2 |
| 6,202,062 | B1 | * | 3/2001 | Cameron et al. .............. 707/3 |
| 6,208,976 | B1 | * | 3/2001 | Kinebuchi et al. ............ 705/15 |
| 6,522,333 | B1 | * | 2/2003 | Hatlelid et al. ............. 345/474 |

FOREIGN PATENT DOCUMENTS

WO     WO0052930     3/2000

* cited by examiner

*Primary Examiner*—Greta Robinson
*Assistant Examiner*—Cheryl Lewis
(74) *Attorney, Agent, or Firm*—Michael E. Belk

(57) ABSTRACT

A method of and system for providing a user profile, comprising user profile maintenance means for maintaining the user profile, visualization means for representing a content item visually as an icon and representing the user profile as a corresponding shape comprising at least one icon representing a content item, and consistency guarding means for guarding the consistency between the user profile and the corresponding shape. The consistency is guarded by changing the corresponding shape in dependence on a change in the user profile, and/or by changing the user profile in dependence on a manipulation of the corresponding shape.

20 Claims, 7 Drawing Sheets

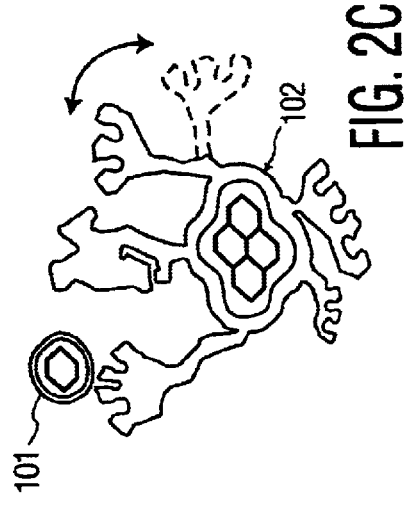
FIG. 2C
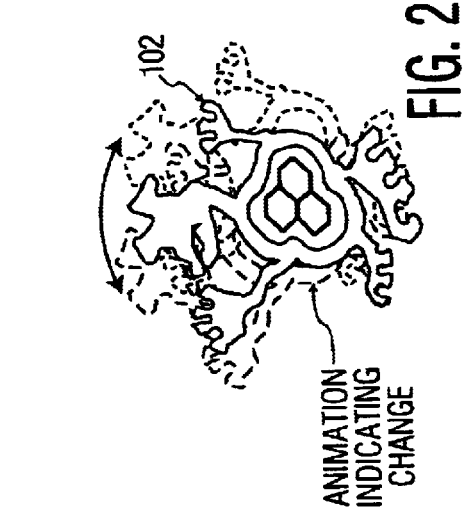
FIG. 2F
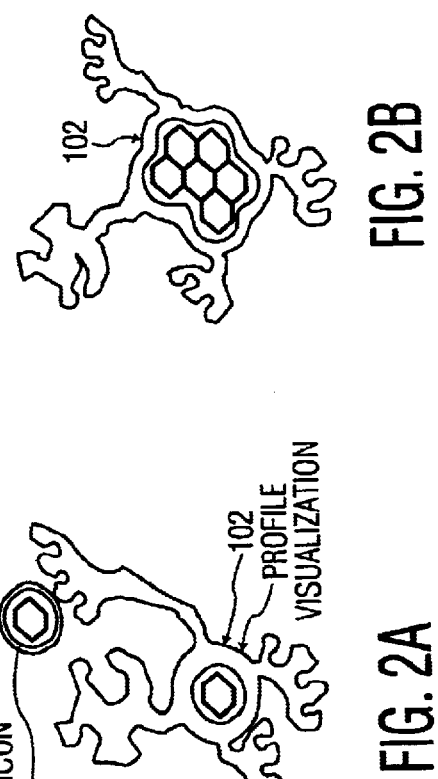
FIG. 2B
FIG. 2E
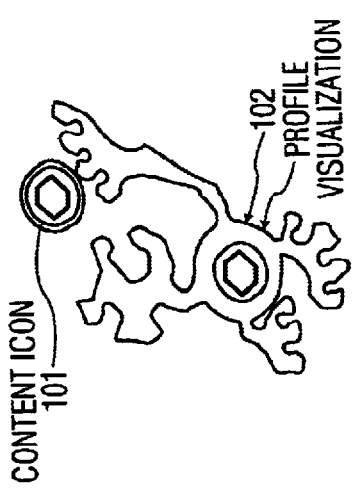
FIG. 2A
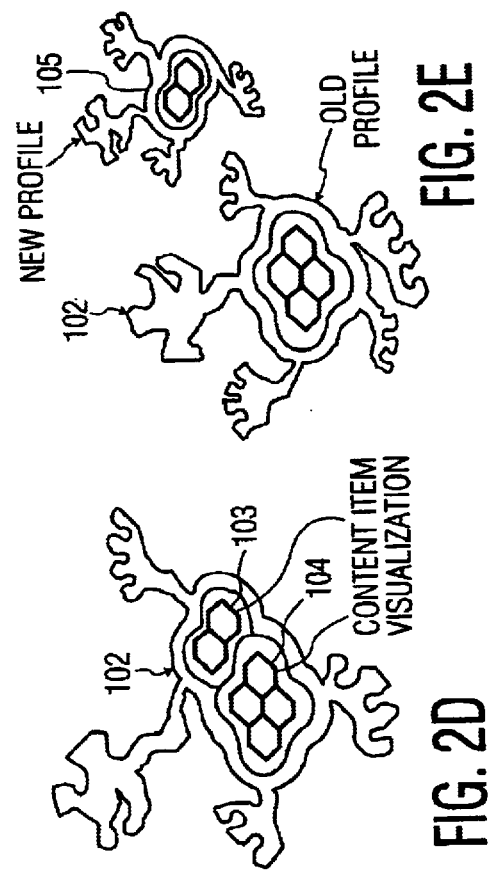
FIG. 2D

METHOD AND SYSTEM FOR PROVIDING A USER PROFILE

The invention relates to a method of providing a user profile.

The invention further relates to a system for providing a user profile.

The invention further relates to a computer program product.

Television receivers, set-top boxes and similar systems often comprise an electronic program guide (EPG) which is capable of receiving and decoding data such as a program title or program category, related to programs and other content items which will be transmitted in the near future. Generally, such an EPG shows a list of program titles and the clock-times, indicating at which time and by which channel the programs will be transmitted. Known user interfaces have the feature of keeping record of the users'preferences and interest. This kind of interest can be stored in a so-called user profile for a user. A user profile comprises metadata with several attributes, which can have values indicating the user's interest, lifestyle, and so on. A possible way of visualizing such a profile is the use of an agent. Such an agent can give advice, suggest programs or help in another way to let the user find information of interest. The agent is sometimes represented as a visual character, such as a talking anthropomorphic shape, which gives suggestions or advice visually and/or audibly. Such a visual character appeals to the user, since it allows him to interact with his user profile by interacting with the visual character.

However, a disadvantage of such a character is that it is static and does not adapt to the user profile. This makes it difficult for the user to associate the recommendations with the character that provides them, and makes the reasons for those recommendations opaque to the user.

It is an object of the invention to provide a method of providing a user profile, which allows a user to identify himself with the user profile.

This object is achieved according to the invention in a method comprising representing the user profile as a corresponding shape comprising at least one icon representing a content item, and guarding the consistency between the user profile and the corresponding shape. The consistency is preferably guarded by changing the corresponding shape in dependence on a change in the user profile, and can further be guarded by changing the user profile in dependence on a manipulation of the corresponding shape. The invention is based on the insight that a visual representation of any form of advice should have some appeal to the user's taste. It then becomes possible for users to identify themselves with the user profile. The visual attributes of a shape are the parameters that can be subject to personalization. Such personalization of a user interface might help to experience more natural interaction. Visualization of a user profile is preferably done by means of an animated body. The animation, that is behaviors of the body, depends on processes inside of the body, in the so-called "belly", as well as outside, within the environment.

Where user preference profiles should be taken into account, these profiles should best be represented as sets of earlier selected items that were considered enjoyable. For an advisor to be taken seriously, its advises should have had high predictive values in the past. To this end, the corresponding shape comprises icons representing content items that were considered enjoyable.

It is a further object of the invention to provide a system for providing a user profile, which allows a user to identify himself with the user profile.

This object is achieved according to the invention in a system comprising user profile maintenance means for maintaining the user profile, visualization means for representing the user profile as a corresponding shape comprising at least one icon representing a content item, and consistency guarding means for guarding the consistency between the user profile and the corresponding shape. In this system, the visualization means ensure that users are provided with a representation of their profile with which they can identify. The consistency guarding means are preferably arranged for causing the visualization means to change the corresponding shape in dependence on the user profile maintenance means changing the user profile. Additionally, the consistency guarding means may be arranged for causing the user profile maintenance means to change the user profile in dependence on the visualization means changing the corresponding shape. This way, the consistency guarding means can ensure that any changes to the user profile are carried through in the corresponding shape, and vice versa, thereby guaranteeing their consistency.

In an embodiment the visualization means are arranged for removing an icon representing a content item from the shape comprising said icon in response to the user profile maintenance means removing the content item from the user profile. A content item whose relevance has decreased, can be deleted. It is then removed from the user profile. To guarantee the consistency, the corresponding shape must be adapted. This can for instance be done by generating an animation in which the icon representing the removed content item is removed and the shape shrinks or trembles.

In a further embodiment the user profile maintenance means are arranged for determining a subset of the content items comprised in an existing user profile, generating a new user profile comprising said subset and feeding the new user profile to the visualization means, and the visualization means are arranged for visualizing a new shape corresponding to the new user profile by visually splitting off the icons corresponding to the content items comprised in said subset from the shape corresponding to the existing user profile and visually forming the new shape. The new shape can exist as a portion of the existing shape, or as a new, independent shape. By splitting the shape into plural new shapes, which then act independently, a large user profile can be managed efficiently. Each shape provides a simplified view on the profile, and the user can choose to interact only with one set at a time, for example, only with movies, or only with news, etc. The profile can be split at the initiative of a user, for example with a button press on the remote control. The profile splits according to the meta-data content description, for example into groups showing different genre.

In a further embodiment the visualization means are arranged for showing an icon representing a content item, and in response to receiving an indication of a preference for the content item, adding the icon representing the content item to the shape corresponding to the user profile and communicating said indication to the user profile maintenance means, the user profile maintenance means being arranged for adding the content item to the user profile. A content item which might be relevant for a user is offered to the user as an icon. The user can check the offer, e.g. by viewing it on his television receiver, and is then given an opportunity to accept or reject the offer. When the user accepts the content item, the shape corresponding to the user profile incorporates the icon. To the user, this represents adding the content item to the user profile, so this change should be incorporated in the user profile.

The invention further relates to a computer program product being arranged for causing a processor to execute the method of the invention.

These and other aspects of the invention will be apparent from and elucidated with reference to the embodiments shown in the drawing, in which:

FIG. 1 schematically shows an embodiment of the system according to the invention;

FIGS. 2a–f schematically show several possible embodiments of visual output as produced by the system;

FIG. 3 schematically shows a set of default representations for use in the system;

Throughout the figures, same reference numerals indicate similar or corresponding features. Some of the features indicated in the drawings are typically implemented in software, and as such represent software entities, such as software modules or objects.

Figure 1:
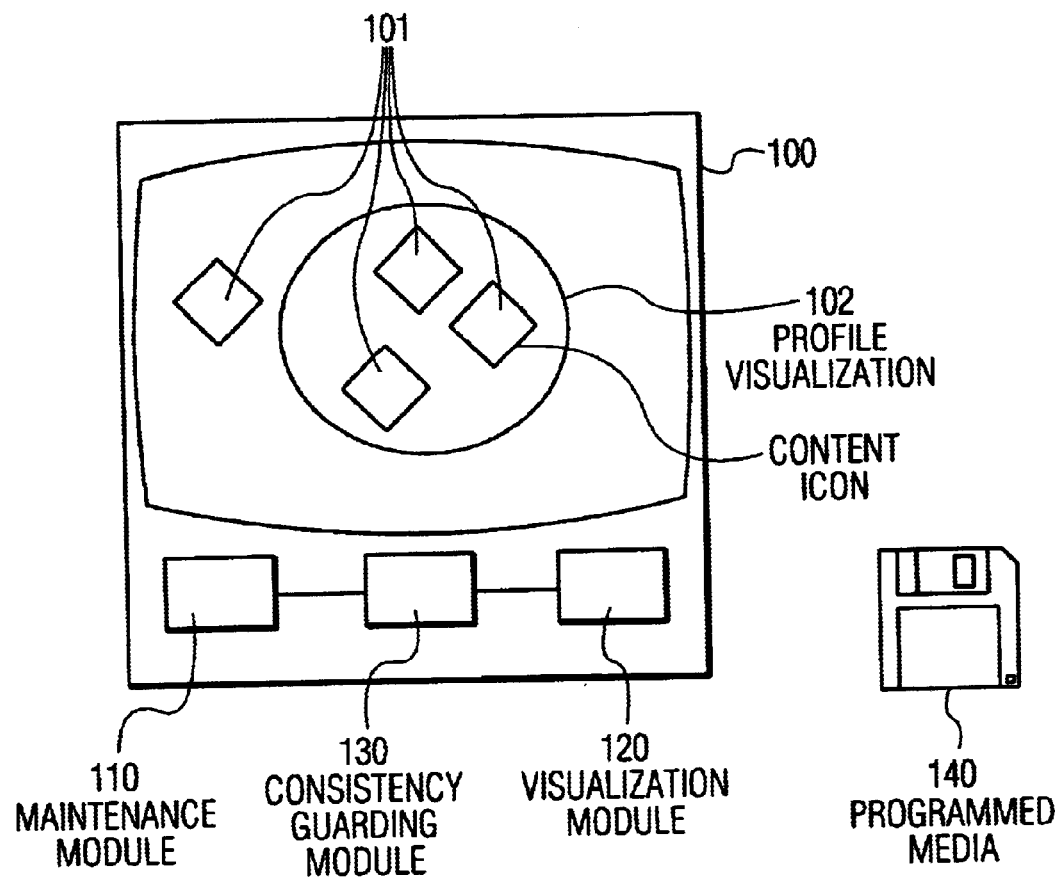

FIG. 1 schematically shows an embodiment of the system 100 according to the invention. The system comprises user profile maintenance module 110, visualization module 120, and consistency guarding module 130.

The user profile maintenance module 120 maintains a user profile. The visualization module 120 represents a content item, such as a television program, visually as an icon 101. The visualization module 120 represents the user profile as a corresponding shape 102 comprising at least one icon 101 representing a content item. The consistency guarding module 130 guards the consistency between the user profile and the corresponding shape 102.

The consistency guarding module 130 preferably operates by causing the visualization module 120 to change the corresponding shape in dependence on the user profile maintenance module 110 changing the user profile. Additionally, the consistency guarding module 130 causes the user profile maintenance module 110 to change the user profile in dependence on the visualization module 120 changing the corresponding shape.

A visual representation of any form of advice should have some appeal to the user's taste. It then becomes possible for users to identify themselves with the user profile. The visual attributes of a shape, are the parameters that are subject to personalization. Such personalization of a user interface might help to experience more natural interaction. Visualization of a user profile is preferably done by means of an animated body. The animation, that is behaviors of the body, depends on processes inside of the body, in the so-called "belly", as well as outside, within the environment.

The shape can be of any form, but preferably is anthropomorphic, i.e. taking a more or less humanlike shape or form, such as with a belly comprising the icons, and limbs like arms and/or legs to allow direct manipulation and visual feedback. This makes the shape easily recognizable and intuitive to interact with. However, the shape might also be amorphous, i.e. not having a rigidly defined form such as a rectangular or gridlike arrangement.

It is beneficial to users that their profile, as maintained by the system 100, could get a visible and interactive representation. Such representation in form of animated shapes that can depict user preferences is communicative, in the sense of being able to communicate about internal system states and changes in information. The main interactive role of these user profiles is to be a direct manipulation tool for accessing content. Such a direct manipulation tool can enable an explicit user feedback. This way the personalization through adaptation might be achieved.

The idea of growing potentially infinite amount of shapes in a process of artificial evolution is a solution to the problem of personalization. In this respect the personalization is understood broader than only filtered digital content delivery, and it includes the appropriate visualization for the adaptive system.

This means that an existence of sets of liked or disliked contents is taken as a starting point and the problem of interactive visualization is how to show changing status of such sets, as well as how to show that different sets belong to different users, assuming that all users would like to identify with their own representation as well as to recognize to whom visible sets belong.

The system 100 can be realized as a computer program product 140, which can be stored on a storage medium such as a floppy disc or CD-ROM, or made available over a network by a file server. The computer program product 140 will, when loaded into a programmable device, cause a processor in said device to execute the method according to the invention. The computer program product 140 enables a programmable device when executing said computer program product 140 to function as the system 100.

FIGS. 2a–f schematically show several possible embodiments of visual output as produced by the system. To properly appreciate the invention, its workings will now be discussed in terms of the output, rather than the components. The construction of the system 100 will be discussed later, with reference to FIG. 4.

FIG. 2a shows a visual representation 102 of a user profile and an icon 101 representing a content item, for example, a digital TV program. The visualization module 120 shows the icon 101 preferably when the user notifies the system that he likes the content item in question. The representation 102 is presented here as an anthropomorphic shape, with limbs and a belly comprising an icon representing a further content item that is incorporated in the user profile represented by the representation 102.

When the user notifies the system that he likes the content item, the content item is of course also added to the user profile.

FIG. 2b shows the representation 102 after several content items have been incorporated in the user profile. The "belly" of the representation 102 is growing big, and the representation 102 may have grown more or different limbs.

FIG. 2c shows an alternative embodiment of the representation 102 interacting with the user. Limbs are used to visualize the changes in the user profile. For instance, the limbs can be use to animate the adding of the content item represented by icon 101 to the user profile, by grasping the icon 101 and adding it to the belly of the representation 102. Alternatively, the representation 102 may be provided with a mouth, and adding can then be animated by swallowing the icon 101 in the mouth. Limbs are also seen as a possible way of gesture based communication with users.

FIG. 2d shows the representation 102 in which the incorporated content items have been grouped into two groups 103, 104. The groups 103, 104 can be distinguished by some criterion, for instance by genre or television channel. The representation 102 as shown in FIG. 2c shows two news programs in the first group 103, and four movies in the second group 104.

FIG. 2e shows the representation 102 from which a new representation 105 has been split off. The user profile maintenance module 110 can determine a subset of the content items comprised in an existing user profile and generate a new user profile comprising said subset. This new user profile is then fed to the visualization module 120, which then visualizes the new shape 105 corresponding to the new user profile by visually splitting off the icons corresponding to the content items comprised in said subset from the representation 102 corresponding to the existing user profile and visually forming the new representation 105.

In FIG. 2f, an icon is removed from the representation 102. This is visualized by generating an animation of a trembling representation 102, which may also shrink in whole or in part to visualize that its "belly" grows smaller. The icon may be removed because the user explicitly requested it, for example by voting negatively on the content item corresponding to the icon being removed. This is then communicated to the user profile maintenance module 110, which removes the content item in question from the user profile. The user profile maintenance module 110 may also have determined that the content item in question is no longer relevant and eliminate it from the user profile. This is then communicated to the visualization module 120, which performs the visualization described above.

Figure 3:
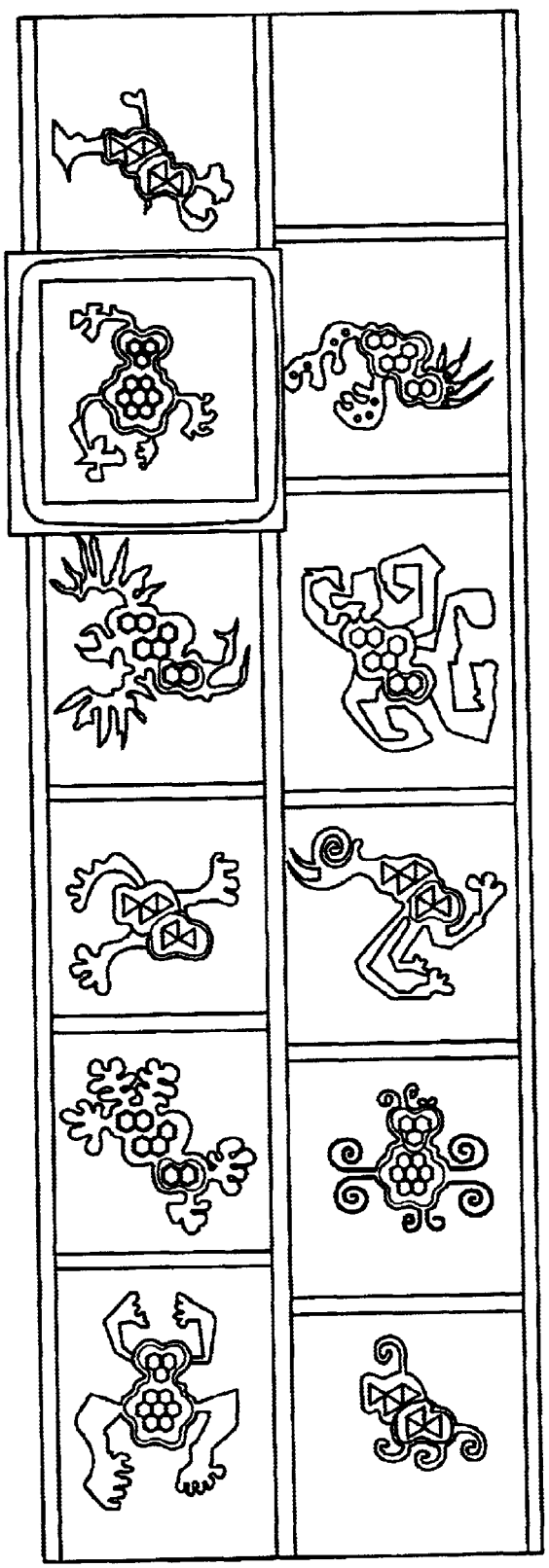

FIG. 3 shows a set of default representations. Visual adaptation of the interface is achieved by introduction of a set of default representation, from which users can select the preferred one, the one which will indicate the direction of evolution of individual user profile.

The final shape of a representation depends not only on the style chosen by a user, but it is also determined by behaviors, which depend on environmental circumstances, such as the spatial arrangement of content, which might provoke a quicker growth of some limbs and atrophy of others.

This means that even if each "embryo" will have encoded a possibility of growth of, say, at most five legs, it is not necessarily the case that it will grow all of them, neither what precise shape and size they will be. The coded features of possible growth—that is "genes" result from the parameterization of shapes. The approach to parameterize shapes for growth is described in details below.

Separately to largely unpredictable growth, representations will have defined behaviors to communicate in a natural way about their current status. This means, that they will be allowed to grow, for example a hand to be able to wave, if a filtering agent will find a piece of content relevant to user preferences.

Figure 4:
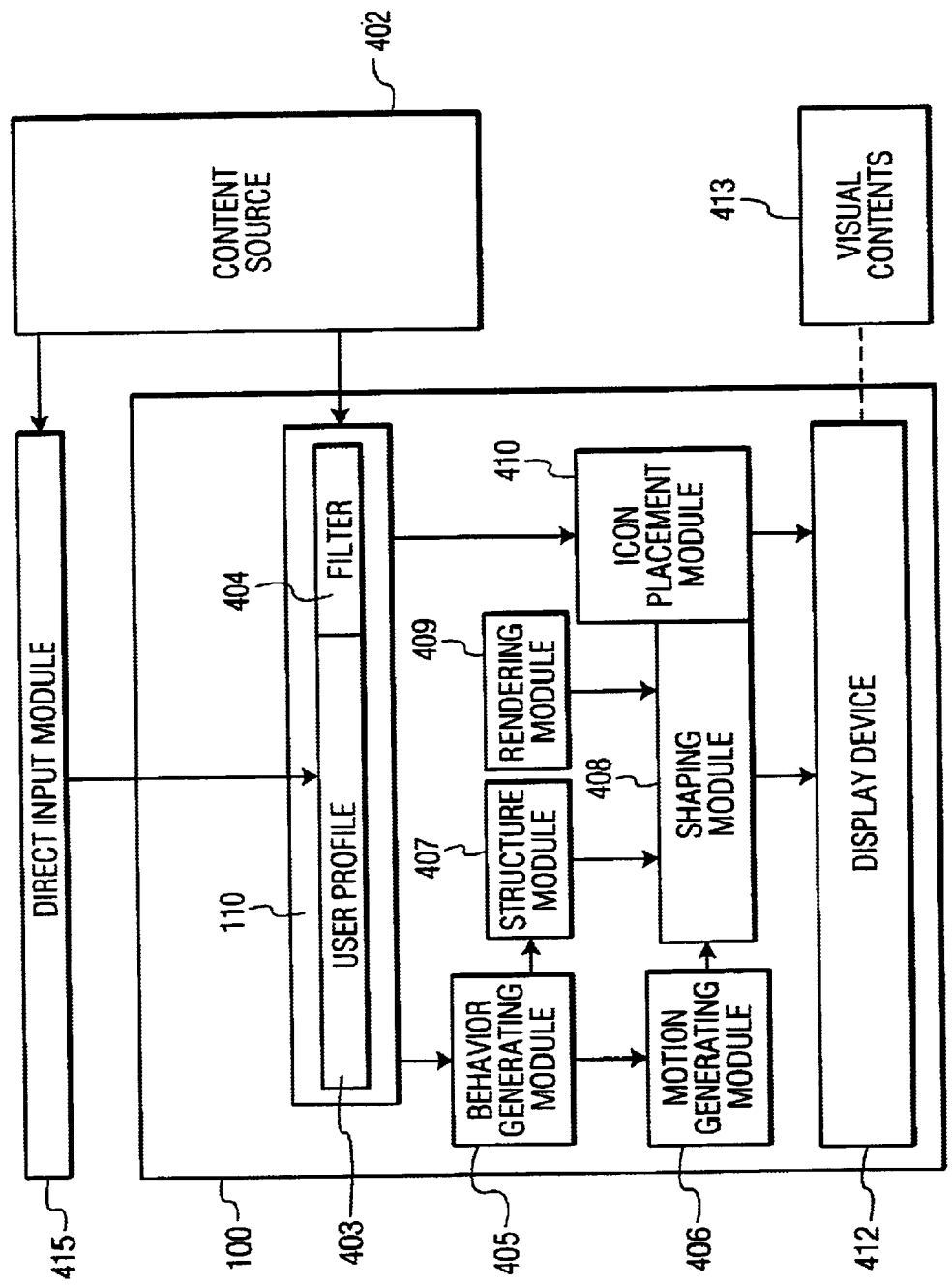
FIG. 4 shows the system according to the invention in more detail.

FIG. 4 shows the system 100 in more detail. Content source 402 delivers information related to content items such as television programs, world-wide web documents, literature, and so on.

The user profile maintenance module 110 holds the user profile 403, a collection of items P that were enjoyed in the past and possibly also a collection of items Q that were disliked in the past. It further comprises a filter 404 that compares the relative distances D(N,P) and D(N,Q), for new incoming items N. Any new incoming item is passed by this filter 404 and the outcome of the relative distances triggers the subsequent behaviors of the user profile maintenance module 110, which are generated by behavior generating module 405. If this distance is sufficiently small, for instance if it is less than the distance D(N,Q) between the new item and items Q that are assumed to be outside the user's user profile 403, the system 100 could conclude that it is worthwhile to recommend N to the user; otherwise, a negative advice should be given. Gradual changes in the user's profile 403 could lead to the removal of old items or to replacement by other items. Also these updates give rise to visual behaviors, which might require user feedback.

At a high level, a behavior consists of rather complex motion patterns, each motion pattern associated to one type of database update or one primitive interaction clause. At a lower level, these behaviors are decomposed in terms of primitive motion primitives: waving a tentacle, grasping an icon, jumping up and down to draw attention, and so on. These low-level motions are generated in motion generating module 406. Structure module 407 represents the articulated 'body' topology of the representation; it represents all kinetic degrees of freedom. However, the components in the structure module 407 are not directly visible: they could be seen as skeletons. The actual geometric shape of the various parts that adorns these skeletal elements in many possible ways is determined in shaping module 408, and the visual quality in the form of color schemes, textures and (faked) illumination effects is added in rendering module 409. As in the example of FIG. 2, the total animated images may contain both the synthesized moving creatures and iconic material that represents the current user profile 403. The motions of the animated creatures should drive the placement of these icons, and icon placement module 410 manages this. Notice that it gets its contents from the current state of the user profile.

The rendered animated advisor-creature and the iconic material that represents the current user profile 403 is shown on display device 412 that may or may not form a physical unity with the display device that shows the actual visual contents 413, for example a TV screen, a virtual book or an LCD screen.

The user can further be provided with a direct input module 415, allowing a direct selection of contents. Since a useful profile that truly represents the user's taste will only grow over time, there has to be a way to solve the 'cold start problem'. The first couple of choices for a new user cannot be made using the filter mechanism outlined above. So the first entries in P will result from direct selection.

A primary mechanism for adaptation is the dynamic update of the sets P and optionally Q. But the visual appearance of the advisor should also adapt. A general proposed mechanism is the following: each of the behavior generating module 405, the motion generating module 406, the shaping module 408 and the rendering module 409 can be defined by means of a set of rules that generate a behavior, a motion, a shape and a rendering style. The shaping module 408 indicates a possible way of implementing and applying these rules. Every rule has a weight factor, and rules can by applied at random where the chance that a rule is chosen is determined by its weight factor. The rules should be such that whatever rules are applied, in whatever order, the total behavior is always according to the high-level goals, and the updates to user profiles and the filtering actions always take place in an appropriate way. Also, whatever the precise shape, defined by the shape-formation rules, it has always to be compatible with the structure as defined in structure module 407, since this structure is necessary to execute the motion patterns that together form the visual representation of the database updates on the sets P and Q.

Adaptation to the user's taste can now be realized through an evolutionary process, as follows. At specified time points, for example once per interaction session, some random selections of rules is performed, and behavior, motion, shape and rendering styles are constructed according to the selected rules. All of this should generate a small number of different creatures which are all identical with respect to the semantics of the activities they perform in order to convey the system messages, e.g. database operations. They are, however, very different with respect to the further details of their behavior, their motions, their shape and their rendering styles. Next the user is asked to select one of these creatures. The weights or fitness of the rules that contributed to the generation of the chosen version are somewhat increased; whereas the weights of the other rules are decreased. A new generation of creatures is then performed, where the probability of using a certain rule is proportional to its fitness. In the next session, the exercise is repeated; where it is made sure that the preferred creature of last time is again among the offered alternatives. In this way, the user is certain that he never gets creatures that are a worse match to his taste than the previous time. In this process, the population of creatures evolves, together with the set of weights of the rules generating those creatures. It is assumed that the set of weights obtained in this way form a representation for the user's taste according to behavior details, motions details, shapes and rendering styles. If this can be confirmed, the mechanism will indeed lead to converging weights, and hence, to a creature that is adapted to the user's taste.

Generation of the shapes can be done through a combination of a shape grammar and non-linear warping. Shape grammars have been used extensively for describing shapes in a procedural way, as is known from for instance Lindenmayer, Aristid, *Mathematical Models for cellular interactions in development*, I & II, Journal of Theoretical Biology, 18, pp. 280–315, 1968; Prusinkiewicz, P., and A. Lindemayer, and J. Hanan, *"Developmental methods of Herbaceous Plants for Computer Imagery Purposes"* Proceedings of SIGGRAPH 1988, pp. 467–478; or M. Sonka, V. Hlava, R. Boyle, *"Image Processing, Analysis, and Machine Vision"*, 1999, Brooks/Cole Publishing Company, Pacific Grove, Calif. (USA), pp. 315–323.

A shape grammar consists of a finite set of substitution rules. A substitution rule has three components: a type name-substitution rule, a structure-substitution rule, and a shape-substitution rule.

A substitution rule serves to substitute a shape segment by one or more other shape segments. A shape segment is, in its simplest form, a curve together with a quadrilateral (ABCD) and a type name. A type name-substitution rule has the form <type name 0>→<type name 1><type name 2><type name 3>... <type name n>, for instance: U→VU.

Figure 5:
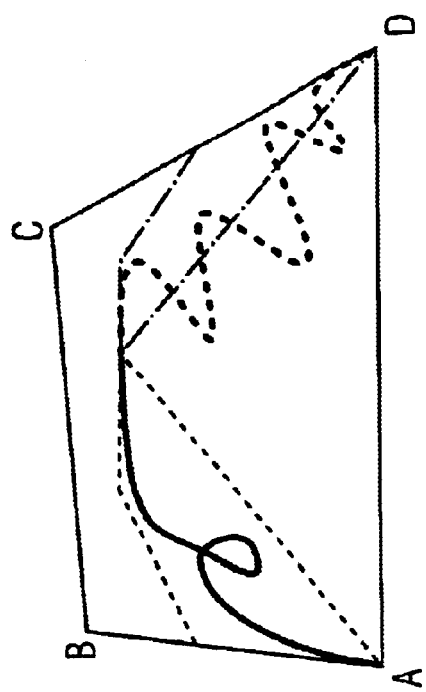
FIG. 5 illustrates a method of adapting the shape of a representation.
Figure 5:
Figure 5:
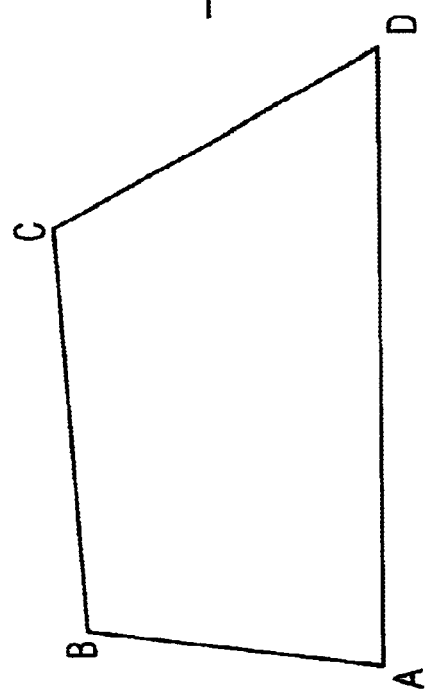

The structure-substitution rule and the shape-substitution rule define what the two curves, in this case, and the quadrilaterals are that together will replace the single shape segment with type name U from the left hand side of the type name-substitution rule. The structure-substitution rule and the shape-substitution rule that accompany the type name-substitution rule U→VU are defined graphically. This replacement rule is shown in FIG. 5.

The interpretation of this figure is as follows. Whenever this rule is to be applied onto an existing shape segment, this shape segment has to have name-type 'U' (this is expressed by the left hand clause, 'U' in the type name-substitution rule U→VU). If such an existing shape segment, say u1, has been found, a transformation is constructed that maps the quadrilateral ABCD in the above figure to u1's quadrilateral. It can be shown that such a mapping is a so-called bi-linear transformation. This geometric mapping is then applied to the two quadrilaterals in the right hand part: the dashed one and the dash-dotted one. The same geometric transformation is also applied onto the two thick curves (the solid curve and the stippled curve). These two curves will replace the original curve that belonged to u1. Further, u1's quadrilateral is replaced by the two smaller (transformed) quadrilaterals, the dashed one and the dash-dotted one. Finally, the name type 'U' for the entire segment u1 is now replaced by a concatenation of two name types, 'V' and 'U'. This means that in a next round, the same rule could again apply to the right most newly created shape segment; however, in order to replace the left most newly created shape segment, we cannot use this rule. If no rule was provided that has the name type 'V' in its left hand part, it cannot be transformed at all; in this case it is called a terminal symbol. If one or more rules of the form 'V→....' are provided, these rules could be applied at a later stage, and the shape segment is called a non-terminal symbol.

As mentioned, it has particular advantages to specify the geometric transformation that will be applied by means of the structure-substitution rule in terms of bi-linear transformations, parameterized by quadrilaterals. Indeed, suppose that the shape segment that belongs to u1 has a curve that starts in the point A of u1's quadrilateral and ends in the points D of u1's quadrilateral. We observe that the two new curves then have the same property. So if the original curve was connected to the rest of the shape (that is, the rest of the shape connected exactly to the points A and D of u1's quadrilateral), then this connection is maintained throughout the shape segment substitution. Even stronger: suppose that the shape segment belonging to u1 was tangent to AB and tangent to CD, and that the rest of the shape smoothly connected to u1's shape segment in A and D (i.e., the tangent of the remaining part of the shape in A was parallel to AB, and the tangent of the remaining part of the shape in D was parallel to CD), then this smoothness is also preserved. In other words, using structure-substitution rules that are parameterized by means of quadrilaterals, and that are implemented by means of the bi-linear mapping that maps the destination quadrilateral to the source quadrilateral, enables us to preserve, if so desired, connectivity (so called $C^0$ continuity) and smoothness (so called $C^1$ continuity).

Figure 6:
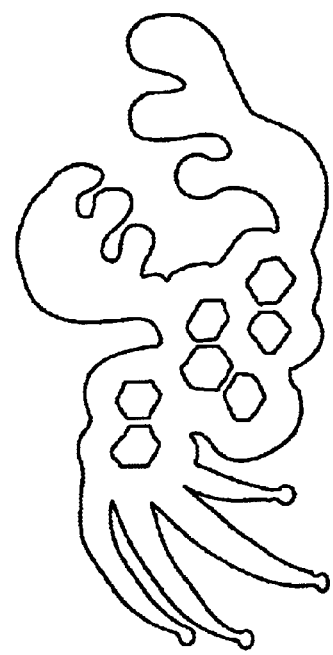
FIG. 6 shows a shape obtained with said method.
Figure 7:
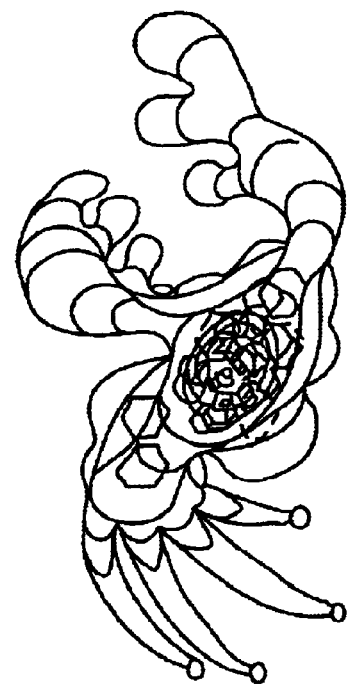
FIG. 7 shows a deconstruction of said shape into a series of simpler shapes that represent the growth path leading to said shape.
Figure 8:
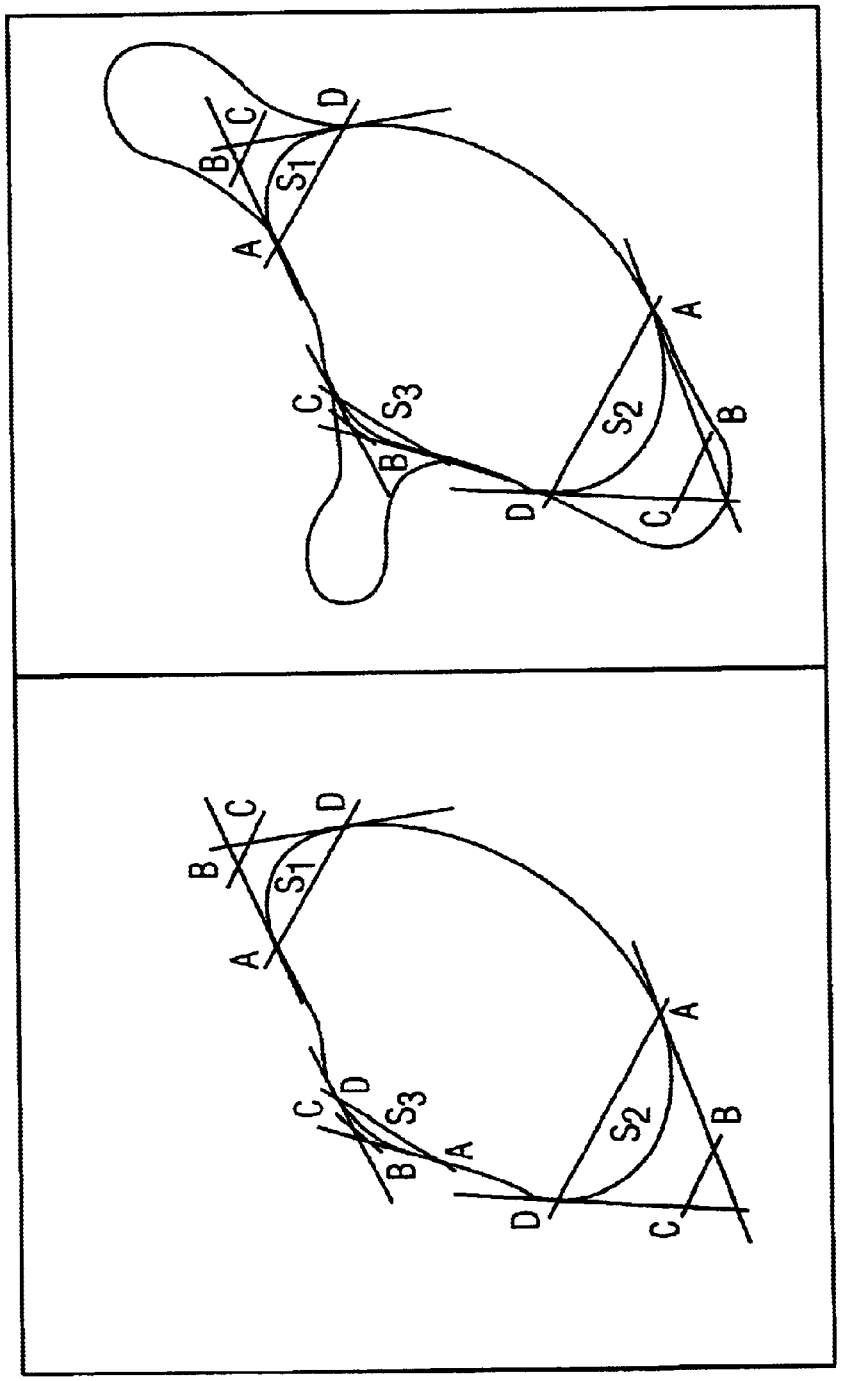
FIG. 8 shows how rules for this deconstruction are derived.

In this way, subsequent application of rules mimics the development of a complex shape out of a primitive shape. The following figures illustrate a part of the process that leads to the rules that should generate a complex shape. FIG. 6 shows the final shape which a designer wants to obtain. FIG. 7 shows a deconstruction of the final shape into a series of simpler shapes that represent the growth path leading to the final shape. In order to propagate from one version to the next over this growth path the rules are needed. FIG. 8 shows how these rules are derived and cast in the form of substitution rules, including structure substitution in the form of appropriate quadrilaterals.

What is claimed is:

1. A method of providing a user profile wherein the user profile is at least based on content viewed by a user, comprising representing the user profile as a corresponding shape comprising at least one icon representing a content item, and guarding the consistency between the user profile and the corresponding shape.

2. A method as claimed in claim 1, wherein the consistency is guarded by changing the corresponding shape in dependence on a change in the user profile.

3. A method as claimed in claim 1, wherein the consistency is guarded by changing the user profile in dependence on a manipulation of the corresponding shape.

4. A computer program product (140) being arranged for causing a processor to execute the method of claim 1.

5. A method as claimed in claim 1, wherein the user profile contains a collection of items previously viewed items as content viewed by the a user.

6. A method as claimed in claim 5, wherein the collection of items previously viewed items identifies items enjoyed by the user.

7. A method as claimed in claim 5, wherein the collection of items previously viewed items identifies items that were not enjoyed by the user.

8. A method as claimed in claim 5, wherein the user profile makes suggestions to the user based upon a filter that reviews the collection of items.

9. A method as claimed in claim 8, wherein the filter reviews the collection of items as spatial arrangement to compare a new piece of content with previously viewed content items.

10. A computer implement system (100) for providing a user profile, comprising user profile maintenance means (110) for maintaining the user profile, wherein the user profile is at least based on content viewed by a user, visualization means (120) for representing the user profile as a corresponding shape (102) comprising at least one icon (101) representing a content item, and consistency guarding (130) means for guarding the consistency between the user profile and the corresponding shape (102).

11. A system (100) as claimed in claim 10, wherein the consistency guarding means (130) are arranged for causing the visualization means (120) to change the corresponding shape (102) in dependence on the user profile maintenance means (110) changing the user profile.

12. A system (100) as claimed in claim 11, wherein the visualization means (120) are arranged for removing the icon (101) representing the content item from the shape (102) comprising said icon (101) in response to the user profile maintenance means (110) removing the content item from the user profile.

13. A system (100) as claimed in claim 11, wherein the user profile maintenance means (110) are arranged for determining a subset of the content items comprised in an existing user profile, generating a new user profile comprising said subset and feeding the new user profile to the visualization means (120), and the visualization means (120) are arranged for visualizing a new shape (105) corresponding to the new user profile by visually splitting off the icons corresponding to the content items comprised in said subset from the shape (102) corresponding to the existing user profile and visually forming the new shape (105).

14. A system (100) as claimed in claim 10, wherein the consistency guarding means (130) are arranged for causing the user profile maintenance means (110) to change the user profile in dependence on the visualization means (120) changing the corresponding shape (102).

15. A system (100) as claimed in claim 14, wherein the visualization means are arranged for showing an icon (101) representing a content item, and in response to receiving an indication of a preference for the content item, adding the icon (101) representing the content item to the shape (102) corresponding to the user profile and communicating said indication to the user profile maintenance means (120), the user profile maintenance means (120) being arranged for adding the content item to the user profile.

16. A system as claimed in claim 4, wherein the user profile contains a collection of items previously viewed items as content viewed by the user.

17. A system as claimed in claim 16, wherein the collection of items previously viewed items identifies items enjoyed by the user.

18. A system as claimed in claim 16, wherein the collection of items previously viewed items identifies items that were not enjoyed by the user.

19. A system as claimed in claim 16, wherein the user profile makes suggestions to the user based upon a filter that reviews the collection of items.

20. A system as claimed in claim 19, wherein the filter reviews the collection of items as spatial arrangement to compare a new piece of content with previously viewed content items.

* * * * *